(12) United States Patent
Lindeborg et al.

(10) Patent No.: US 6,532,503 B1
(45) Date of Patent: Mar. 11, 2003

(54) METHOD AND APPARATUS TO DETECT LOST BUFFERS WITH A DESCRIPTOR BASED QUEUE

(75) Inventors: Carl John Lindeborg, Shrewsbury, MA (US); James Scott Hiscock, Rockport, MA (US); Normand Louis Magnan, Woonsocket, RI (US); John Ernest Ziegler, Westborough, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/507,358

(22) Filed: Feb. 18, 2000

(51) Int. Cl.[7] ............................................. G06F 13/00
(52) U.S. Cl. ........................ 710/52; 710/53; 710/54; 710/55; 710/56; 710/57
(58) Field of Search ............................ 710/52, 53, 54, 710/55, 56, 57

(56) References Cited

U.S. PATENT DOCUMENTS

| | | | | |
|---|---|---|---|---|
| 4,807,111 A | * | 2/1989 | Cohen et al. | 710/54 |
| 5,951,656 A | * | 9/1999 | Finnell | 710/54 |
| 5,995,511 A | * | 11/1999 | Zhou et al. | 370/412 |

* cited by examiner

*Primary Examiner*—Jeffrey Gaffin
*Assistant Examiner*—Mohammad O. Farooq
(74) *Attorney, Agent, or Firm*—McGlew and Tuttle, P.C.

(57) ABSTRACT

A main data memory is provided in a network device and includes a plurality of buffers for storing data packets. A plurality of descriptors, or pointers, point to the individual buffers. A status of the descriptors is stored in a descriptor reference memory. The status information includes whether the descriptors are in an active or free state, and an indication of copies of the descriptors in the transmit queues. A descriptor free pool includes a list of the descriptors in the free state.

20 Claims, 6 Drawing Sheets

METHOD AND APPARATUS TO DETECT LOST BUFFERS WITH A DESCRIPTOR BASED QUEUE

FIELD OF THE INVENTION

The present invention relates to a descriptor based memory queuing system for transmitting data packets to one or more transmit ports in a device of a computer network, and in particular to a system where lost buffers can be detected.

BACKGROUND OF THE INVENTION

Many computer network devices, such as bridges, routers, switches and/or hubs, receive data packets and must then forward these packets to one or more transmit ports. The determination of which transmit ports a particular packet is to be sent to, is performed by the higher logic of the network device and is already well known to those skilled in the art. The speed at which each transmit port can send out data packets depends on the speed of the connection, the speed of the receiving port and other factors that can change for each port. Also a data packet can be sent to more than one port at a time, in a process known as multicasting, broadcasting and flooding.

Therefore it is important that the status of the individual transmit ports be closely coordinated with the presence of data packets which are to be sent out on those ports. This can be done using transmit queues for each transmit port and copying a pointer or descriptor into the proper transmit queue which points to the address of a buffer in a main data memory which stores the data packet.

A problem in this descriptor queuing scheme is the loss of buffer descriptors. Generally, these problems result from, logic errors in the buffer descriptor management. Lost buffers is potentially a serious problem preventing full utilization of the main memory. In prior art systems, lost buffers can exist in perpetuity or until a full system reset. Also the number of lost buffers tend to increase with time, causing an increasing under utilization of the device and continual degradation of the network.

SUMMARY AND OBJECTS OF THE INVENTION

It is a primary object of the present invention to rapidly detect lost buffers, and prevent network degradation. It is also an objective to then place the buffers back in service without having to restart the entire network device, particularly when queuing is implemented in hardware and can not be easily corrected if there is a fault in the design.

The present invention accomplishes this object by providing a main data memory in the network device. The main data memory includes a plurality of buffers for storing data packets. A plurality of descriptors, or pointers, point to the individual buffers. A descriptor free pool includes a list of the descriptors in the free state.

When the system receives a data packet, it takes one of the descriptors from the descriptor free pool and stores the data packet in the buffer of the main memory as pointed to by that descriptor.

The system, and more particularly a queue control logic, places a copy of the descriptor in one or more of the plurality of transmit queues of which the queue control logic has previously determined the data packet should be sent out on.

The first embodiment of the invention provides two sets of counters to track buffer descriptors. One set of counters tracks the total number of free and active descriptors. The second set of counters tracks the total number of copies of each active descriptor.

When a descriptor is removed from the free pool, the Free Pool Entry Count is decremented. Similarly, when a descriptor is placed back on the Free Pool, the Free Pool Entry Count is incremented.

There is a one for one correspondence between a Reference Memory Location and each buffer/descriptor. Descriptor Reference Memory stores the status of each descriptor and the number of copies of each descriptor.

When a descriptor is placed on one or more transmit queues, the Reference Memory Entry Count is incremented. The descriptor specific Reference Memory location is updated, state is changed from free to active and the copy count indicates the number of transmit queues which have copies of the descriptor. The copy count is also added to the Transmit Queue Elaborated Count and the Reference Memory Elaborated Count.

When a descriptor is removed from a transmit queue, the Transmit Queue Elaborated Count is decremented. When the data associated with the descriptor has been sent to the destination port, the Reference Memory Elaborated Count is decremented as is the descriptor specific count in Reference Memory. When the descriptor specific count decrements to zero, the descriptor state is changed from active to free, the Reference Memory Entry Count is decremented and the descriptor is returned to the Free Pool.

The second embodiment of the invention provides per port descriptor status as well as overall activity status for each buffer descriptor location in Reference Memory. The status of the descriptors is stored in a descriptor reference memory. The status information includes overall status which includes the states of idle, pending, first poll and lost. The status information also includes port status information for each descriptor. Each port status information includes active and free states for each transmit queue. Also provided is a means for the periodic polling of the overall activity state.

When a packet is received, a descriptor is removed from the Free Pool. When the descriptor is placed on one or more of the transmit queues, the overall activity state in the corresponding Reference Memory location moves from Idle to Pending. Each port that received a copy of the descriptor will have its corresponding per port status set to Active.

When a descriptor is removed from a transmit queue, the corresponding per port status is set to Free. If the per port status of all ports is Free, the overall activity state of the descriptor is set to Idle and the descriptor is returned to the Free Pool.

Lost buffers can occur, and can be detected, in several different parts of the network device.

In the first embodiment, it is possible to detect lost buffers by monitoring the descriptor free pool, and the descriptor reference memory. Since all of the descriptors should either be in the descriptor free pool, or should have an active status in the descriptor reference memory, the sum of the number of descriptors in the free pool with the number of descriptors having an active state in the descriptor reference memory should remain constant and equal to the total number of descriptors. A count of the number of descriptors in the descriptor free pool, and of the active descriptors in the descriptor reference memory is maintained and periodically checked. If the total of these two numbers does not equal the total number of descriptors, an error is indicated.

A transmit queue elaborated counter and a reference memory elaborated counter are also provided to maintain separate accounting of the descriptors in the transmit queues. When a descriptor is placed in one or more transmit queues, both the transmit queue elaborated counter and the reference memory elaborated counter are incremented by the number of queues to which the descriptor is added. When a descriptor is removed from one of the transmit queues, the transmit queue elaborated counter is decremented. When the data packet corresponding to the removed descriptor is transmitted by the port, the reference memory elaborated counter is decremented. Because of the time difference in decrementing the transmit queue elaborated counter and the reference memory elaborated counter, the value of these counters will be different until all of the data packets for the removed descriptors have been transmitted. However at no time, should the difference between the counters be greater than the number of ports. This is because each port should only be holding one data packet before the reference memory elaborated counter is decremented. If the difference between the values of the two counters is greater than the number of ports, a lost buffer is indicated.

When a lost buffer is indicated, the overall healing system can be reinitialized. This involves clearing memory, and resetting counters, which is known to the person of ordinary skill in the art and is therefore not described further in this specification.

As an alternative to initializing the entire queue system, just the main memory, the plurality of transmit queues, the descriptor reference memory, the count and the descriptor free pool can be initialized when the total of the number of descriptors in the free pool plus the number of descriptors having the active state does not equal the total number of descriptors. If the lost buffer is indicated due to a discrepancy between the transmit queue elaborated counter and the reference memory elaborated counter, these counters can also be reinitialized.

In a second embodiment, a more elaborate detection of lost buffers is provided. The descriptor reference memory includes two different types of information for each descriptor. One type of information, is the overall status of the descriptor. This overall status has the states of idle, pending, first poll, and lost. The second type of information is port status information. Each descriptor specific entry in reference memory keeps track of which transmit queues have a copy of the descriptor has been placed onto. The port status information for each descriptor therefore has a separate marker for each of the transmit queues, and this marker can indicate a free or an active state. If a copy of the descriptor is on a particular transmit queue, the marker for that transmit queue will have the active state. Correspondingly if a transmit queue does not have a copy of the descriptor, the marker for that transmit queue in that descriptor status information will be in the free state.

When a copy of the descriptor is placed in one or more transmit queues, the corresponding markers in the descriptor reference memory are set to the active state, and the overall status for that descriptor is set to the pending state.

Every time a copy of a descriptor is removed from a transmit queue, the corresponding marker in the status information for that descriptor is set to the free state. The remaining markers in that descriptor status information are checked to see if any other markers are in the active state. If other markers are in the active state, then the overall status is set to, or remains at, the pending state. If no other markers for that descriptor are on the active state, the overall status for that descriptor is set to idle.

This checking determines whether or not other copies of the descriptor are in other transmit queues, after a copy has been removed from one transmit queue. In order to accomplish this checking, the individual queues could be directly checked instead of checking the markers for a particular descriptor.

The overall status information of the descriptors, as maintained in the reference memory, is polled repetitively. If the overall status information of a descriptor is found to be pending during a polling operation, the overall status information for that descriptor is then set to the first poll state. If during the polling process, an overall status is found to be in the first poll state, the overall status is then set to the lost state. The removing of descriptors from the transmit queues occurs repetitively, and is interspaced with the polling. If the removal of a descriptor occurs, and the overall status is in either the first poll or lost state, the overall status is set to pending. Note that allowing the overall state to move from Lost to Pending allows for the return of descriptors that have been incorrectly marked as Lost.

When descriptors have an overall status of the lost state, corrective action can occur. In the second embodiment, the corrective action occurs when the number of descriptors having an overall status of lost is above a predetermined threshold value.

When the number of descriptors in the lost state is above this threshold value, the port status of these descriptors are checked, and the transmit queues that correspond to the markers in the active state are also checked. If the transmit queues do not contain the lost descriptor, the descriptor can be recovered by initializing the descriptor reference memory for that descriptor and adding that descriptor to the descriptor free pool. If the descriptor is found on the transmit queue, the descriptor can be left on the transmit queue, to be eventually transmitted. The overall status can be changed back to pending, or the overall status can remain in the lost state with the checking reoccurring every time the threshold is exceeded.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
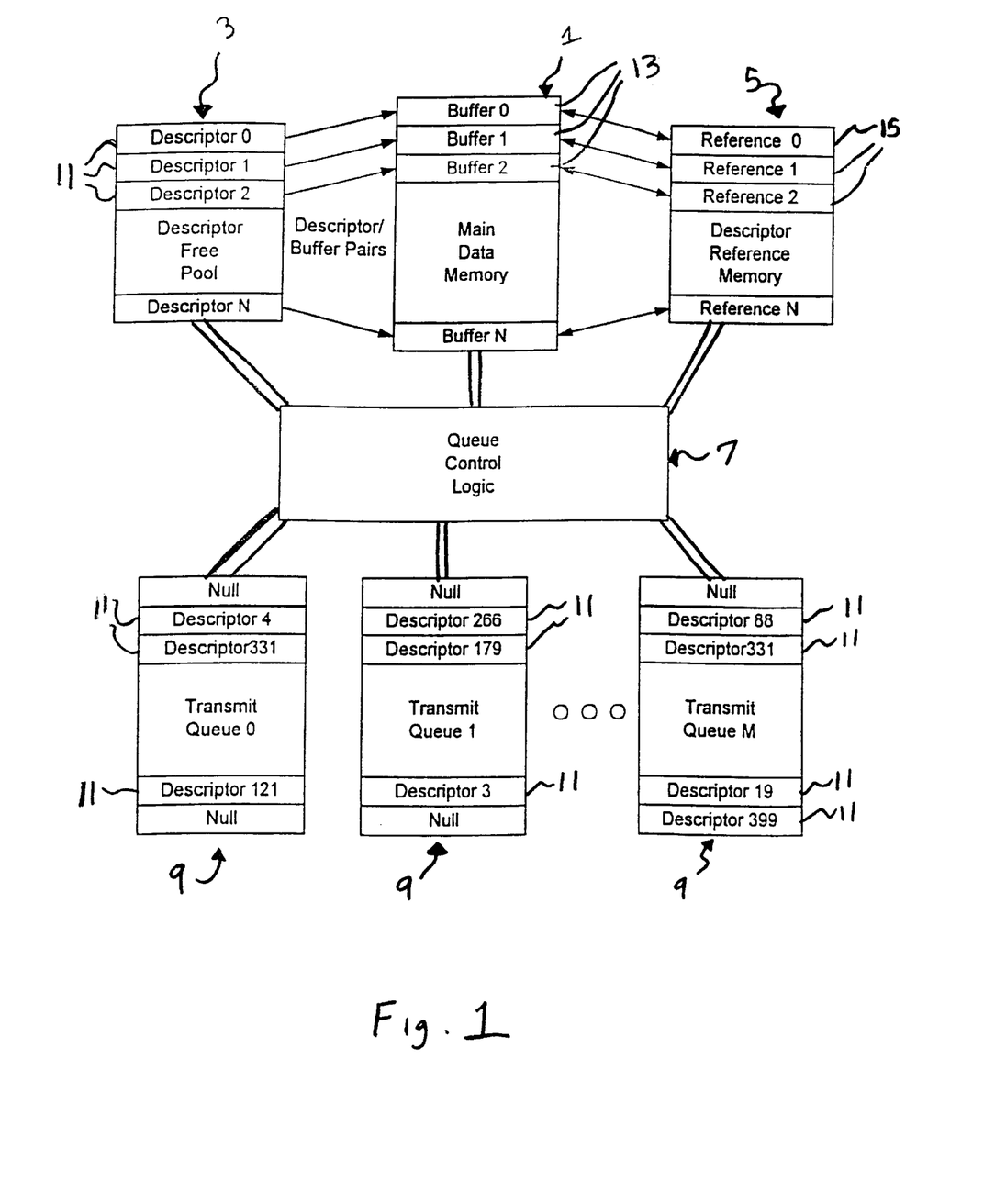
FIG. 1 is a schematic diagram of the individual components of the network device according to the present invention.

Referring to the drawings, and in particular to FIG. 1, the Memory/Queuing system consists of 5 major components;

Main Data Memory 1, Descriptor Free Pool 3, Descriptor Reference Memory 5, Transmit Queues 9, and the Queuing Control Logic 7.

In this system, buffer descriptors 11 are used to allocate memory blocks or buffers 13 to individual packets of packet streams. Each buffer descriptor 11 is a pointer to the starting address of a fix length block or buffer 13 of memory. Thus, the number of descriptors 11 is proportional to the capacity of the Main Data Memory 1. In the simplest application, one descriptor 11 points to a buffer 13 (block of memory), that is large enough to hold a maximum length data packet.

More complex applications will use descriptors 11 which point to buffers 13 which are smaller than the maximum packet size. In this case, several descriptors 11 (Descriptor Set) may be used to accommodate large packets. When descriptor sets are used, the set is treated as a unit for the duration of the packet transfer.

Packet data is written to the Main Data Memory 1 when it is received. Packet Data is read by each transmit queue 9 each time a copy is sent.

The Descriptor Free Pool 3 is a FIFO memory which contains a list of all unused buffer descriptors 11. The Descriptor Control logic 7 will obtain a descriptor 11 (descriptor set) from the Descriptor Free Pool 3 when a packet is being received/written to the main Data Memory 1. The Descriptor Control Logic 7 will return a descriptor 11 (descriptor set) to the Descriptor Free Pool 3 when all copies of the packet have been sent.

The Transmit Queues 9 are associated with a specific destination port. Each Queue 9 is a FIFO memory which contains a list of buffer descriptors 11 (descriptor sets). In the simplest application, there is a single transmit queue 9 for each port. Multiple queues may exist for a port, typically to implement class or quality of service.

The Descriptor Reference Memory 5 is used to track the number of copies of each descriptor 11 that has been placed on transmit queues 9. The Descriptor Reference Memory 5 has one unique reference location 15 for each buffer 13 and descriptor 11. This reference location 15 is indexed by the buffer descriptor value.

In the descriptor based Memory/Queuing scheme of the present invention, buffers and their descriptors exist in two forms. For the purpose of this specification, we will refer to them as the "Simple" and "Elaborated" forms. "Simple" form refers to the places where there is a single reference to the descriptor, indicating the presence or absence. The Descriptor Free Pool 3 and Descriptor Reference Memory Addressing are the two places where there is always a single reference to each descriptor 11. Each descriptor 11, in the "Simple" form, should appear in one and only one of the two places.

Figure 2:
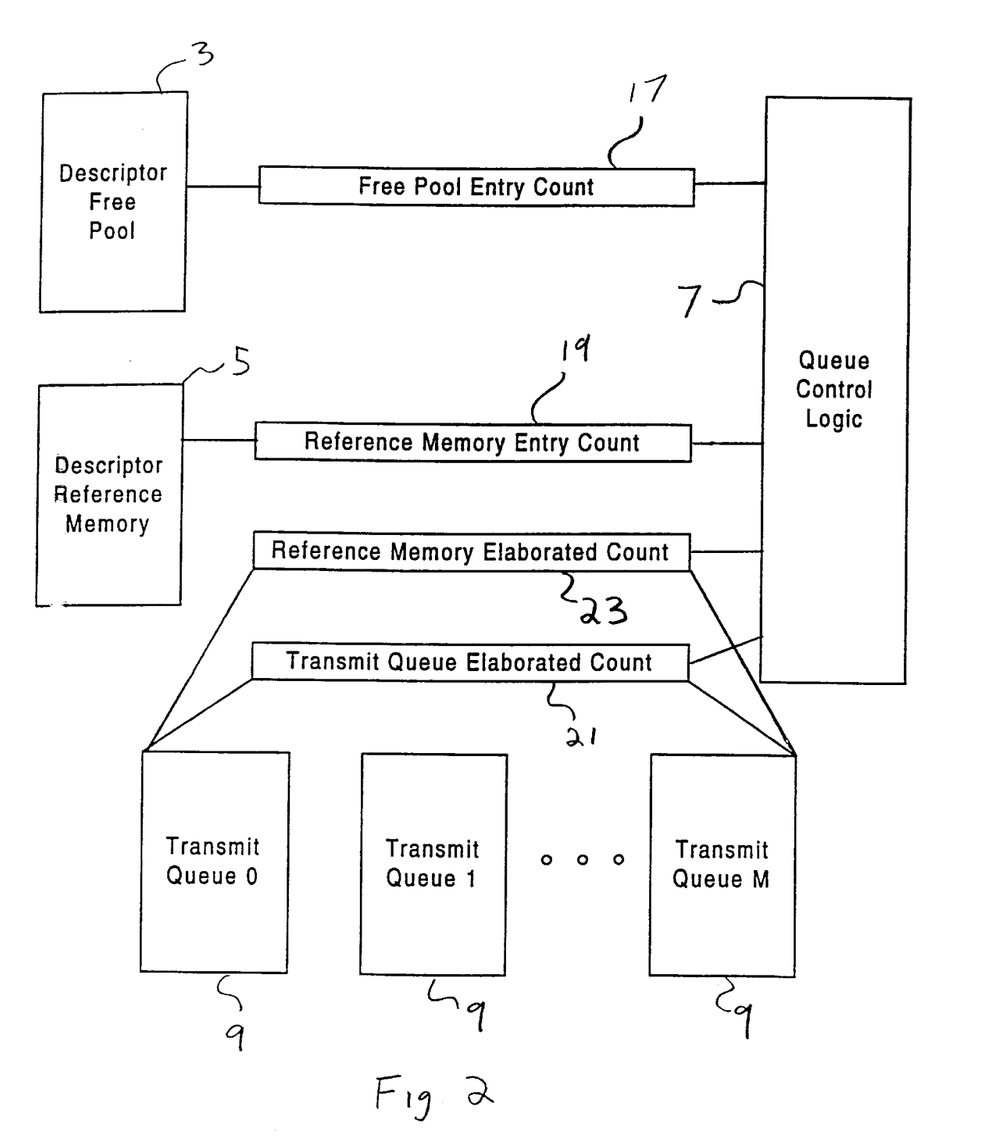
FIG. 2 is a schematic diagram showing the connections of the counters relative to the memory, transmit queues and control logic in a first embodiment of the present invention.
Figure 3:
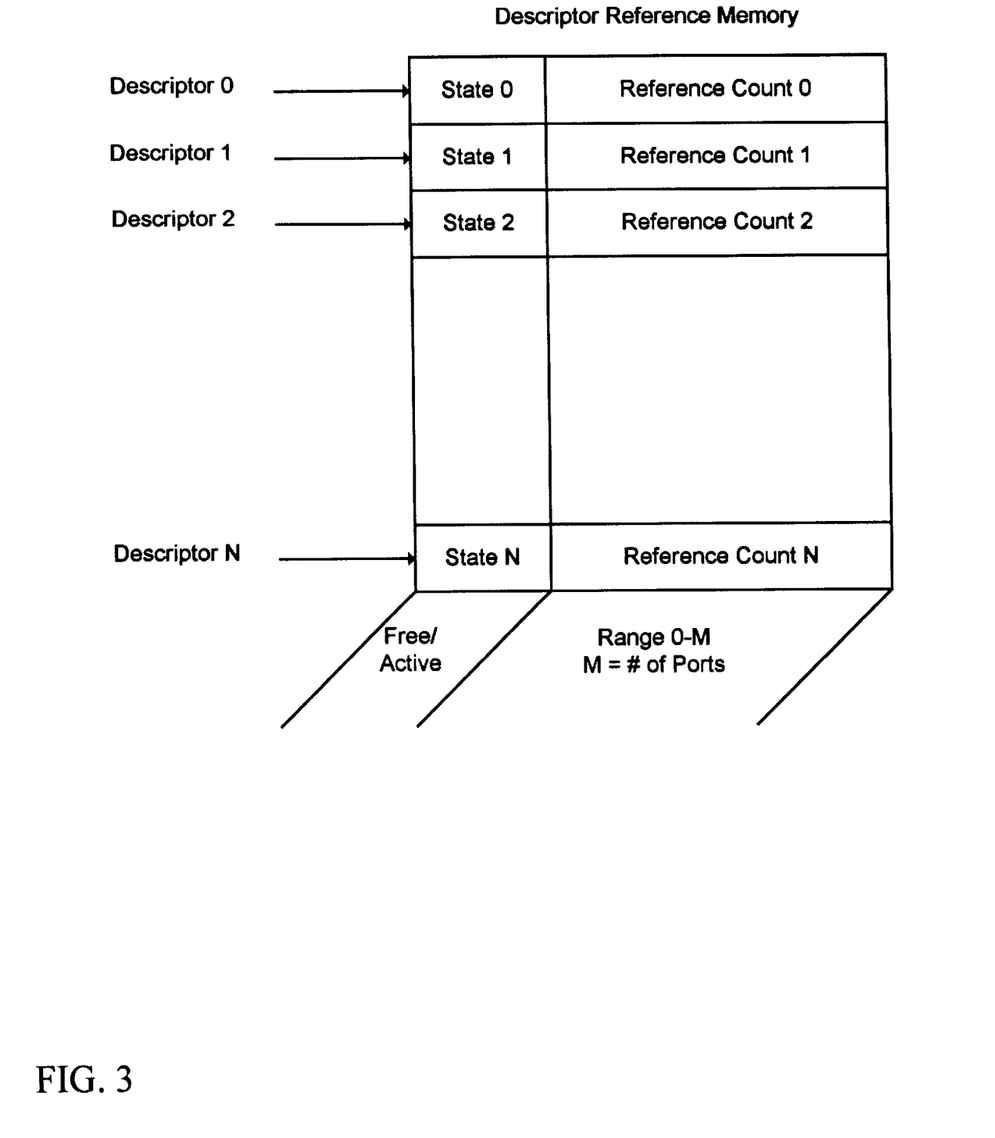
FIG. 3 is a schematic diagram showing the internal structure of the descriptor reference memory according to the first embodiment.
Figure 4:
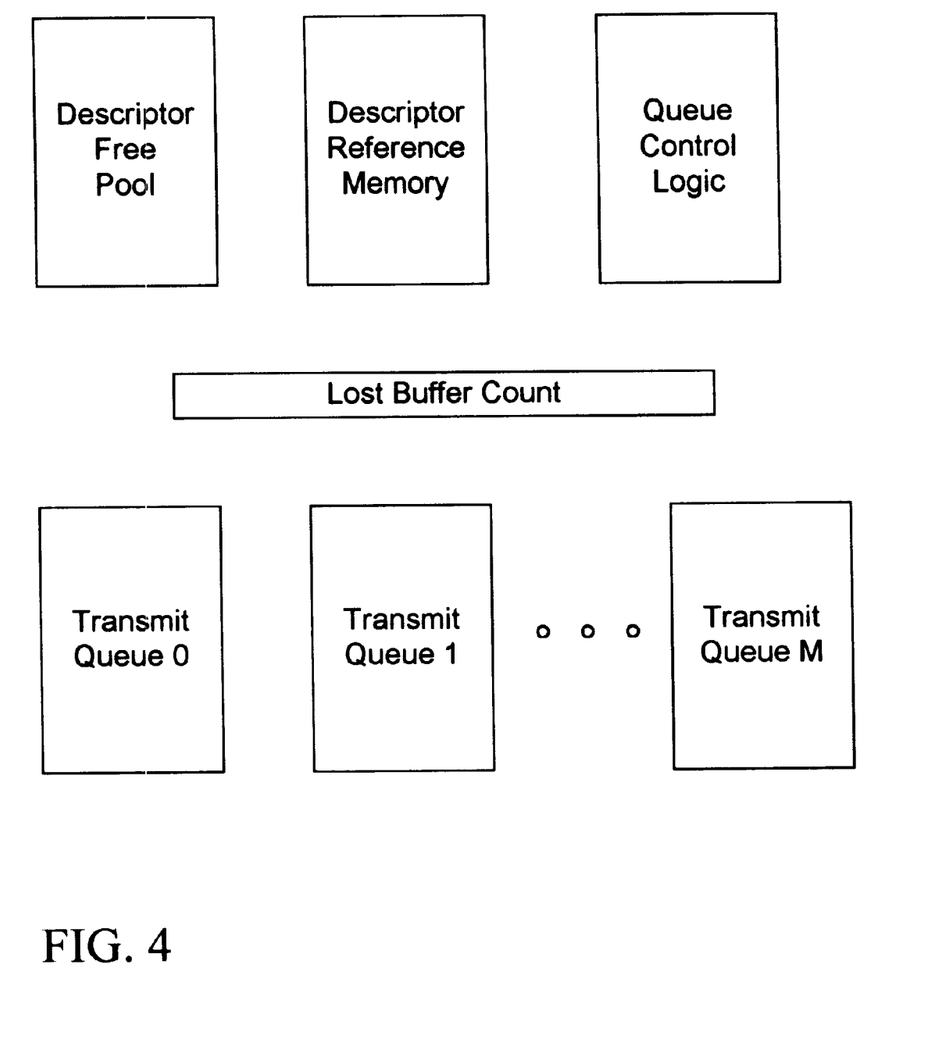
FIG. 4 is a schematic diagram showing the major components of the second embodiment.

As shown in FIG. 2, a free pool entry counter 17 tabulates the number of descriptors in the descriptor free pool 3. A reference memory entry counter 19 tabulates the number of descriptors in the descriptor reference memory 5. If the sum of the values of the counters 17 and 19 do not equal the total number of descriptors, then a Lost Buffer Error, "Simple" form, has occurred.

The "Elaborated" form of each descriptor 11 exists where there are one or more references to a descriptor 11. The Descriptor Reference Memory data value and the Transmit Queues 9 are the two places where there can be one or more references to single descriptor 11. The total number of references to the descriptor, "Elaborated" form, in the Descriptor Reference. Memory S should be consistent with the total number of copies on the Transmit Queues 9. If this is not the case, then a Lost Buffer Error, "Elaborated" form, has occurred.

The simplest form of Buffer Loss detection takes the form of tracking "simple" and "elaborated" buffer count. In the case of "simple" buffers, the entry total will always remain constant. Thus the sum of buffers available in the Descriptor Free Pool 3 and number of "Active" entries in the Descriptor Reference Memory 5 should equal the total number of buffers.

In the case of "Elaborated" buffers, counters track the number of elaborated buffers, with one counter for each elaborate buffer or descriptor 11. The counters total the number of copies of all descriptors 11 in the Transmit Queues 9 and the Reference Memory 5. Each time a descriptor 11 is written to the Transmit Queues 9, the value representing the total number of transmit queues 9 which accepted the descriptor 11 is provided to the descriptor specific reference memory location. That value is added to both the Transmit Queue elaborated counter 21 and the Reference memory elaborated counter 23. Each time a transmit port removes a descriptor from an associated Transmit Queue 9, the Transmit Queue elaborated counter 21 is decremented. Each time a transmit port completes the transmission of a packet, the Reference memory elaborated counter 23 and the specific reference memory location are decremented. The Transmit Queue Elaborated Buffer Counter 21 should not differ from the Reference memory elaborated counter 23 by a value greater than the number of active transmit ports due to the time delay between removing a copy of descriptor from the transmit queue 9 and the transmission of the packet related to that descriptor 11. This method provides a simple mechanism by which lost buffers may be detected. When fault is detected and recovery is required, the queuing sub-system is reinitialized.

Figure 5:
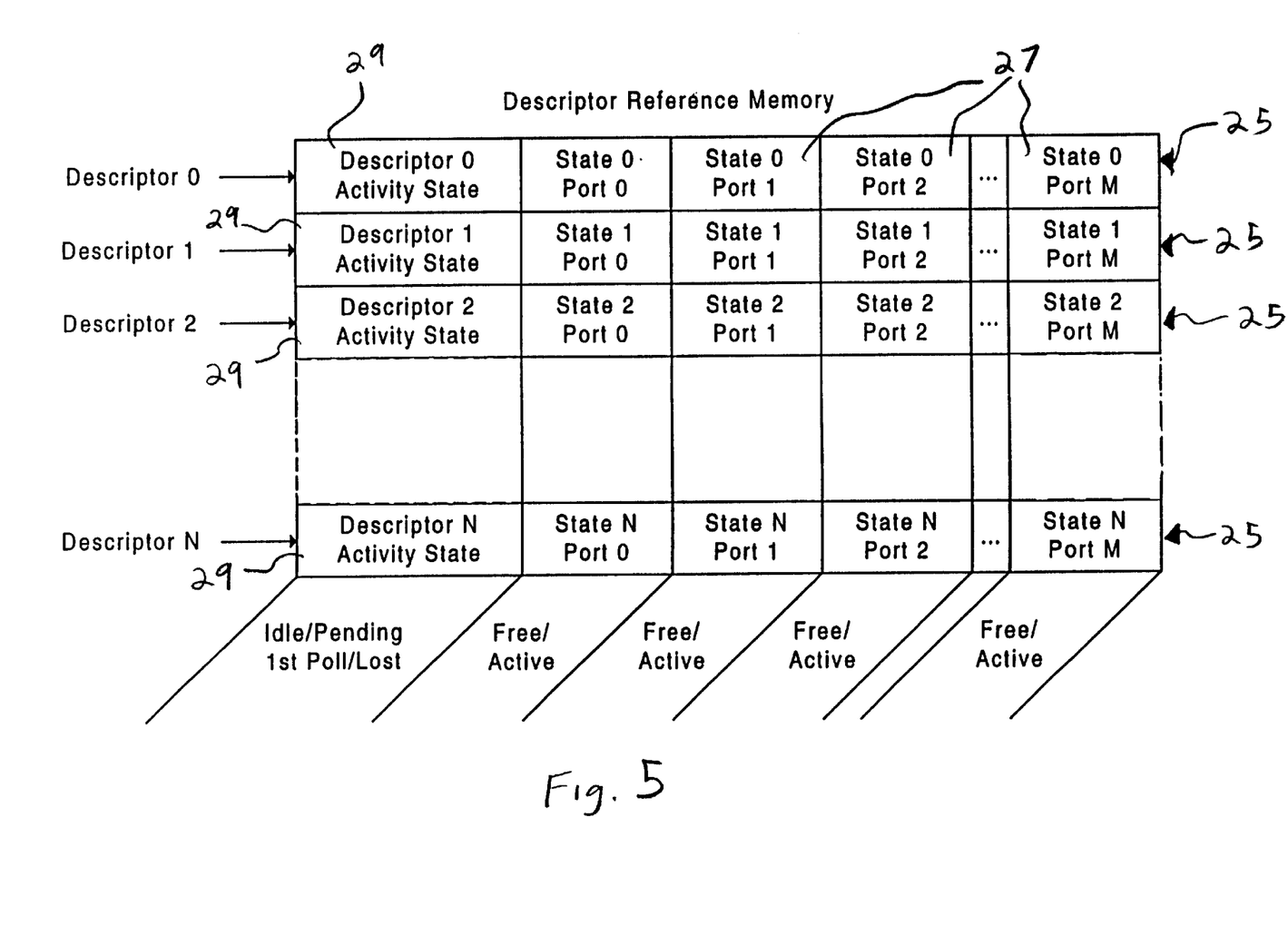
FIG. 5 is a schematic showing the internal structure of the descriptor reference memory according to a second embodiment.

In the second embodiment, the state of the individual descriptors is tracked. This embodiment uses a Descriptor Reference Memory 5, as shown in FIG. 5, that has a Reference Memory Address for each descriptor. Each Reference Memory Address can hold one of a plurality of different overall activity states 29 per descriptor 11 and one of a plurality of different port states 27 for each transmit port or transmit queue 9. In this embodiment there is a one to one correspondence between a Reference Memory Address 25 and each buffer/descriptor 11. The state method requires that each Descriptor Reference Memory address 25 contain port state information 27 for each possible destination port or transmit queue 9. As all buffer/descriptors 11 are used in a first come/first serve basis, all buffers in the system will be utilized equally over a statistically significant period.

Port state information 27 is stored for each Descriptor Reference Memory location 25 and for each transmit port. Although a transmit port may have more than one transmit queue 9, a descriptor may only exist on one transmit queue per port. Descriptor Reference Memory entries may be optimized to such that descriptor state is tracked on a per port basis. Port state information 27 is updated at initialization and each time the Queue Control Logic 7 Enqueues or DeQueues a buffer descriptor 11. When one or more copies of a buffer descriptor 11 is placed on Transmit Queues 9, the corresponding port state is set to "Active" and the overall Activity state 29 of the descriptor is set to "Pending". When a descriptor 11 is removed from a transmit queue 9, and the corresponding data is transmitted, the corresponding port state 27 is set to "Free". If all port states 27 are in the "Free" state, the overall Activity State 29 for the descriptor 11, is set to "Idle" and the descriptor 11 is returned to the Free Pool 3. Else, the overall Activity state 29 is set to "Pending".

Buffer loss checking in the second embodiment is performed by polling the overall activity state 29 of each descriptor 11 in Descriptor Reference Memory. Polling events are initiated through the Queue Control Logic. Polling consists of sequentially examining the overall Activity State 29 of each descriptor location 25 in Descriptor Reference Memory. The Queue Logic examines the overall Activity State 29 and operates on it as specified in FIG. 6 (State Based Lost Buffer Detection State Machine). If the overall Activity state 29 is "Idle" or "Lost", the overall Activity State 29 remains unchanged. If the overall Activity state 29 is "Pending" the overall Activity state 29 moves to "First Poll". If the overall Activity State 29 is "First Poll", the overall Activity state 29 moves to "Lost" and the Lost Buffer Count is incremented.

Figure 6:
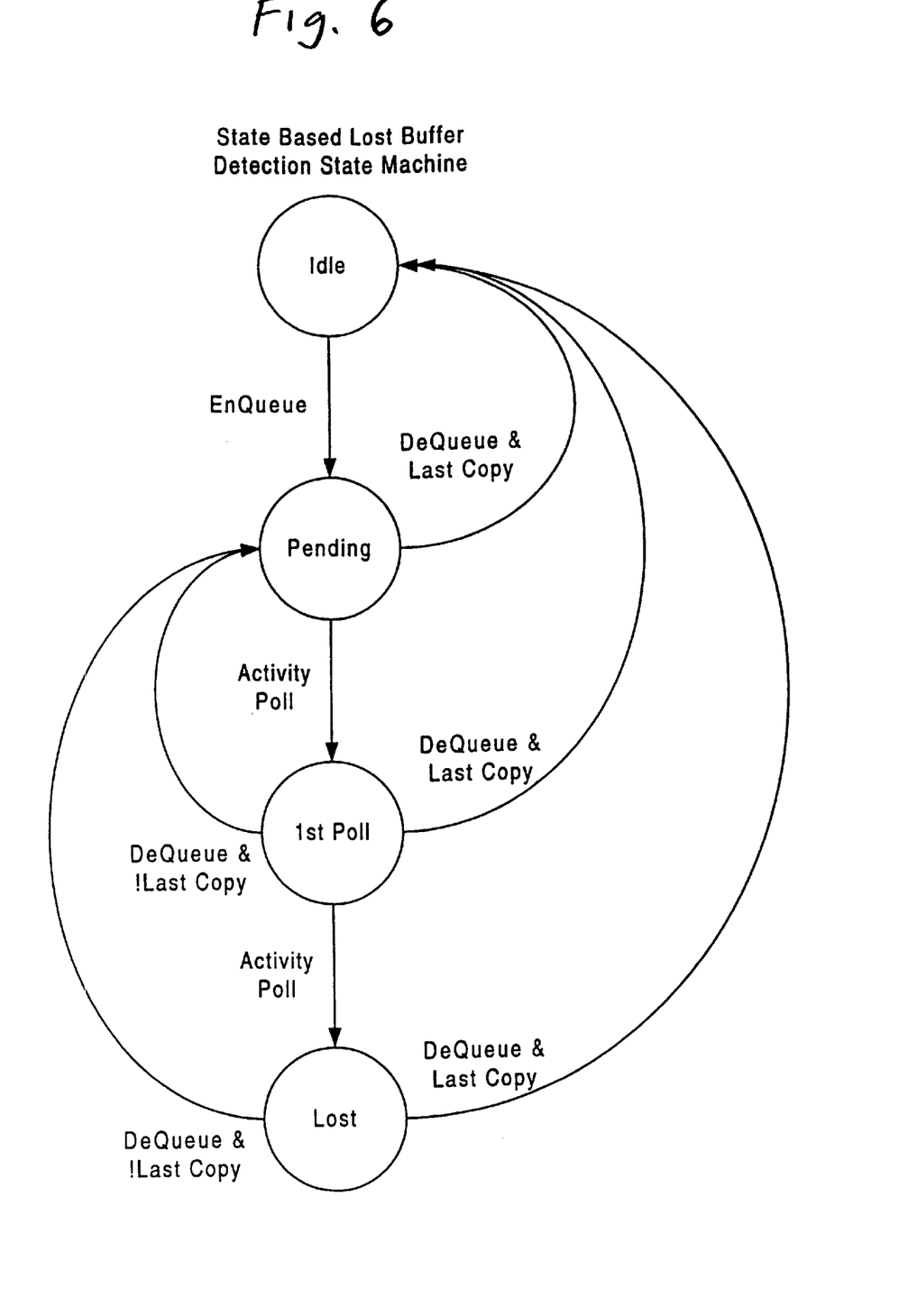
FIG. 6 is a state machine diagram of the second embodiment for detecting lost buffers.

Activity polling is used to detect buffers/descriptors 11 that have one or more outstanding copies on transmit queues 9 but have not been transmitted in the expected time frame. When a buffer/descriptor 11 is determine to be not active for two or more poll periods, it is considered lost. Buffers 11 may be incorrectly marked as lost if network events cause inordinate delays. Each time a buffer 11 is deemed to be "Lost" a Lost Buffer Counter is incremented. If activity is detected on a buffer 11 that had been marked "Lost", the activity state 29 and Lost Buffer Counter are updated. When the number of lost buffers 11 exceeds a preset threshold, corrective action may be taken. If the overall activity state 29 of a buffer 11 moves from "Lost" through a recovery event, the Lost Buffer Counter is decremented.

The activity state or overall status information 29 for each buffer specific location 25 is set to "Idle" at initialization. When the Queue Control logic 7 adds a descriptor 11 to one or more transmit queues 9 (EnQueue), the activity state 29 is set to "Pending". Each time a copy of the buffer 11 is removed from a transmit queue 9 (DeQueue), the queue control logic 7 checks if that descriptor/buffer was the last copy of the descriptor 11 on any transmit queue 9. If it was the last, the activity state 29 is set to "Idle". If additional copies remain on transmit queues, the activity state 29 remains "Pending". If the activity state 29 in buffer location 25 is polled and found in the state "Pending" the activity state 29 is set to the state "First Poll". If the buffer location 25 is polled and found in state "First Poll" the activity state 29 is set to the "Lost" state. If a DeQueue event occurs while the activity state 29 is in one of states "First Poll" or "Lost", the activity state 29 moves to the "Pending" or "Idle" state as appropriate. FIG. 6 is a state machine diagram of the second embodiment for detecting lost buffers.

There are several advantages of the second embodiment or State Method of Detecting Lost Buffers. Foremost is the deterministic nature. Each Descriptor Reference Memory location 25 holds the "Lost" state and a bit or marker indicating transmit ports/queues 9 with outstanding copies of the buffer 11. Specific transmit queues 9 are identified as holding the lost buffer 11. A maintenance function such as a general purpose microprocessor could be used to scan that transmit queue 9. If the buffer 11 is not found, the lost buffer can be recovered by initialized the Descriptor Reference Memory location 25 and adding the buffer 11 to the Descriptor Free Pool 3. If the buffer 11 is found on the transmit queue 9, the maintenance function may allow the buffer 11 to remain. As only the specific buffer 11 and transmit queue 9 are effected, buffer recovery may be performed with out affecting other ports/queues.

While specific embodiments of the invention have been shown and described in detail to illustrate the application of the principles of the invention, it will be understood that the invention may be embodied otherwise without departing from such principles.

What is claimed is:

1. A method for detecting lost buffers in a descriptor based queue, the method comprising the steps of:

providing a main data memory with a plurality of buffers for storing data packets;

providing a plurality of descriptors, each of said plurality of descriptors pointing to one of said buffers;

providing a plurality of transmit queues for transmitting data packets;

providing a descriptor reference memory storing status information of said plurality of descriptors, said status information including active and free states of respective said descriptors;

providing a descriptor free pool including a list of said descriptors having said status information of said free state;

receiving a data packet;

removing one of said descriptors from said descriptor free pool;

setting said status information for said one descriptor to said active state;

storing said data packet in said buffer of said main memory as pointed to by said one descriptor;

calculating a count of a number of said descriptors in said descriptor free pool and a number of said descriptors having said status information of said active state in said descriptor reference memory;

indicating a lost buffer if said count is not equal to a number of said plurality of descriptors.

2. The method in accordance with claim 1, further comprising:

removing a descriptor from one of said transmit queues;

transmitting a data packet corresponding to said removed descriptor;

setting said status information of said removed descriptor to said free state and entering said removed descriptor into said descriptor free pool.

3. The method in accordance with claim 1, further comprising:

providing a transmit queue elaborated counter and a reference memory elaborated counter;

placing a copy of said one descriptor in one or more of said plurality of transmit queues;

incrementing said transmit queue elaborated counter and said reference memory elaborated counter for each said transmit queue said one descriptor was placed into;

removing a descriptor from one of said transmit queues;

decrementing said transmit queue elaborated counter every time a descriptor is removed from said transmit queues;

transmitting a data packet corresponding to said removed descriptor;

decrementing said reference memory elaborated counter every time a data packet is transmitted;

indicating a lost buffer if said transmit queue elaborated counter differs from said reference memory elaborated counter by an amount greater than a number of said transmit queues.

4. The method in accordance with claim 1, further comprising:

initializing the descriptor based queue when said lost buffer is indicated.

5. The method in accordance with claim 1, further comprising:

initializing said main memory, said plurality of transmit queues, said descriptor reference memory, said count and said descriptor free pool when said lost buffer is indicated.

6. The method in accordance with claim 3, further comprising:
initializing said main memory, said plurality of transmit queues, said descriptor reference memory, said transmit queue elaborated counter, said reference memory elaborated counter, said count and said descriptor free pool when said lost buffer is indicated.

7. A method for detecting lost buffers in a descriptor based queue, the method comprising the steps of:
providing a main data memory with a plurality of buffers for storing data packets;
providing a plurality of descriptors, each of said plurality of descriptors pointing to one of said buffers;
providing a plurality of transmit queues for transmitting data packets;
receiving a data packet;
storing said data packet in said buffer of said main memory as pointed to by one of said plurality of descriptors;
providing a transmit queue elaborated counter and a reference memory elaborated counter;
placing a copy of said one descriptor in one or more of said plurality of transmit queues;
incrementing said transmit queue elaborated counter and said reference memory elaborated counter for each said transmit queue said one descriptor was placed into;
removing a descriptor from one of said transmit queues;
decrementing said transmit queue elaborated counter every time a descriptor is removed from said transmit queue;
transmitting a data packet corresponding to said removed descriptor;
decrementing said reference memory elaborated counter every time a data packet is transmitted;
indicating a lost buffer if said transmit queue elaborated counter differs from said reference memory elaborated counter by an amount greater than a number of said transmit queues.

8. The method in accordance with claim 7, further comprising:
providing a descriptor reference memory storing status information of said plurality of descriptors, said status information including active and free states of respective said descriptors;
providing a descriptor free pool including a list of said descriptors having said status information of said free state;
removing one of said descriptors from said descriptor free pool and said storing of said received data packet is in said buffer of said main memory as pointed to said one descriptors removed from said descriptor free pool;
setting said status information for said descriptor removed from said free pool to said active state;
calculating a count of a number of said descriptors in said descriptor free pool and a number of said descriptors having said status information of said active state in said descriptor reference memory;
indicating a lost buffer if said count is not equal to a number of said plurality of descriptors.

9. The method in accordance with claim 7, further comprising:
initializing the descriptor based queue when said lost buffer is indicated.

10. The method in accordance with claim 7, further comprising:
initialing said main memory, said plurality of transmit queues, said transmit queue elaborated counter, and said reference memory elaborated counter when said lost buffer is indicated.

11. The method in accordance with claim 8, further comprising:
initializing said main memory, said plurality of transmit queues, said descriptor reference memory, said transmit queue elaborated counter, said reference memory elaborated counter, said count and said descriptor free pool when said lost buffer is indicated.

12. A method for detecting lost buffers in a descriptor based queue, the method comprising the steps of:
providing a main data memory with a plurality of buffers for storing data packets;
providing a plurality of descriptors, each of said plurality of descriptors pointing to one of said buffers;
providing a plurality of transmit queues for transmitting data packets;
providing a descriptor reference memory storing overall status information of said plurality of descriptors, said overall status information including states of idle, pending, and first poll for each of said descriptors;
receiving a data packet;
selecting one of said descriptors with an overall status of idle;
storing said data packet in said buffer of said main memory as pointed to by said one descriptor;
placing a copy of said one descriptor in one or more of said plurality of transmit queues;
setting said overall status information of said one descriptor in said descriptor reference memory to said pending state;
transmitting data packets from said main data memory corresponding to said copies of said descriptors in said transmit queues, and removing corresponding said copies of said descriptors from corresponding said transmit queues after said transmitting;
checking a corresponding descriptor for each transmitted said data packet after said transmitting, said checking including determining if a copy of said corresponding descriptor is present in other said transmit queues;
setting said overall status for said corresponding descriptor to said idle state if said checking indicates a copy of said corresponding descriptor is not present in any other said transmit queues;
setting said overall status for said corresponding descriptor to said pending state if a copy of said corresponding descriptor is present in any other said transmit queues;
polling said overall status for each of said descriptors, said polling including changing said overall status of each of said descriptors to said first poll state if a respective overall status is pending.

13. The method in accordance with claim 12, wherein:
said overall status information includes the state of lost;
said polling includes changing said overall status of each of said descriptors to said lost state if a respective overall status is said first poll.

14. The method in accordance with claim 12, wherein:

said transmitting, said checking, and said polling occur at a plurality of occasions.

15. The method in accordance with claim 13, wherein:

said transmitting, said checking, and said polling occur at a plurality of occasions.

16. The method in accordance with claim 13, further comprising:

recording a number of said descriptors with said overall status having said lost state as a lost number;

indicating an excess lost error when said lost number is above a predetermined value.

17. The method in accordance with claim 16, further comprising:

scanning said transmit queues for copies of said descriptors having said lost state when said excess lost error is indicated.

18. The method in accordance with claim 12, wherein:

said descriptor reference memory separately stores port status information for each said descriptor, each said port status information includes active and free states for each of said plurality of transmit queues;

said storing of said copy of said one descriptor in said transmit queues includes setting said port status of said transmit queues participating in said storing of said one descriptor to said active state;

said transmitting of said data packets includes setting said port status of said transmit queues participating in said transmitting of one of said descriptors to said free state after a data packet of said one of said descriptors is transmitted from said one of said transmit queues;

said checking including checking said port status information for said determining if a copy of said corresponding descriptor is present in other said transmit queues.

19. The method in accordance with claim 16, wherein:

said descriptor reference memory separately stores port status information for each said descriptor, each said port status information includes active and free states for each of said plurality of transmit queues;

said storing of said copy of said one descriptor in said transmit queues includes setting said port status of said transmit queues participating in said storing of said one descriptor to said active state;

said transmitting of said data packets includes setting said port status of said transmit queues of one of said descriptors to said free state after a data packet of said one of said descriptors is transmitted from said one of said transmit queues;

said checking including checking said port status information for said determining if a copy of said corresponding descriptor is present in other said transmit queues;

upon indication of said excess lost error, said port status of said descriptors having said lost state is reviewed to determine which said transmit queues have said active state, said transmit queues having said active state are scanned to find said descriptor, if said descriptor is found said descriptor remains in said transmit queue, if said descriptor is not found said overall status is set to idle.

20. A system for detecting lost buffers in a descriptor based queue, the system comprising:

a main data memory with a plurality of buffers for storing data packets;

a plurality of descriptors, each of said plurality of descriptors pointing to one of said buffers;

a plurality of transmit queues for transmitting data packets;

a descriptor reference memory storing status information of said plurality of descriptors, said status information including active and free states of respective said descriptors;

a descriptor free pool including a list of said descriptors having said status information of said free state;

queue control logic detecting a data packet, removing one of said descriptors from said descriptor free pool, setting said status information for said one descriptor to said active state, and storing said data packet in said buffer of said main memory as pointed to by said one descriptor, said queue control logic calculates a count of a number of said descriptors in said descriptor free pool and a number of said descriptors having said status information of said active state in said descriptor reference memory, said queue control logic then indicates a lost buffer if said count is not equal to a number of said plurality of descriptors.

* * * * *